April 7, 1964 A. L. LAPAIX 3,127,908
APPARATUS FOR INJECTING A METERED AMOUNT OF A GAS INTO
A LIQUID, SUITABLE IN PARTICULAR FOR USE
AS A CHLORINATION APPARATUS
Filed Sept. 16, 1960 3 Sheets-Sheet 1

April 7, 1964

A. L. LAPAIX 3,127,908

APPARATUS FOR INJECTING A METERED AMOUNT OF A GAS INTO
A LIQUID, SUITABLE IN PARTICULAR FOR USE
AS A CHLORINATION APPARATUS

Filed Sept. 16, 1960

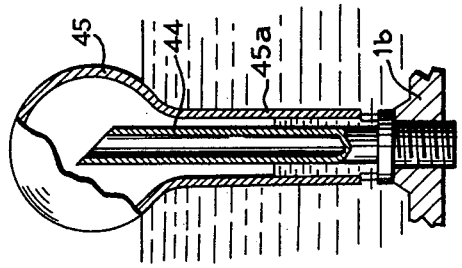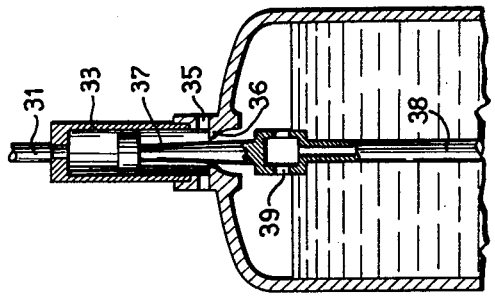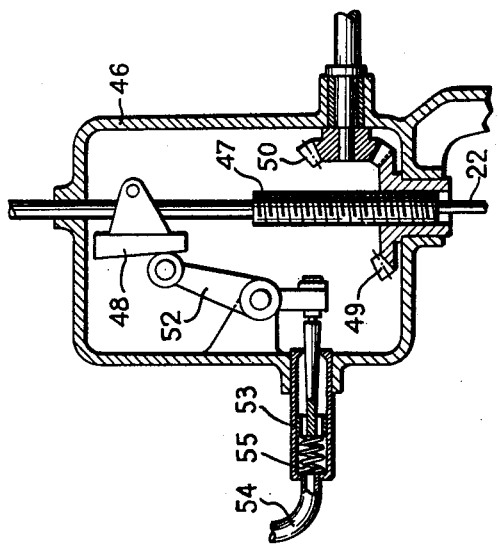

0
United States Patent Office 3,127,908
Patented Apr. 7, 1964

3,127,908
APPARATUS FOR INJECTING A METERED AMOUNT OF A GAS INTO A LIQUID, SUITABLE IN PARTICULAR FOR USE AS A CHLORINATION APPARATUS
André Louis Lapaix, 8 Residence Beausoleil, Saint-Cloud, France, assignor of one-half to Prat-Daniel, Paris, France, a French body corporate
Filed Sept. 16, 1960, Ser. No. 56,490
Claims priority, application France Sept. 24, 1959
17 Claims. (Cl. 137—501)

The present invention relates to apparatus for injecting a metered amount of a gas into a liquid. Since such apparatus are mainly used for injecting chlorine into water, for purposes of sterilisation, the subsequent description will be made in connection with the latter application, it being understood that the apparatus may as well be applied to other gases and other liquids than chlorine and water, respectively.

The injection of chlorine into water gives rise to a certain number of problems owing to the toxic and corroding properties of this gas. In the devices presently in use for this operation, the chlorine supplied from a liquefied gas bottle is expanded in various reducing valves of the membrane type, prior to being injected into water.

In order to meter the amount of injected gas, the inlet pressure of the chlorine into water must be controlled, so that the ascertaining of the amount of chlorine actually introduced into the water requires the chlorin to be passed through a manometric-type counter. Thus, the chlorine gas has to be brought into contact with quite a number of fragile members, such as membranes and counters, which are rapidly destroyed by the gas so that amounts of toxic gas can leak out. Moreover, the very concept of such metering means does not allow an accurate estimate of the amount of injected chlorine.

The invention has for its object to overcome the aforesaid drawbacks by providing an improved apparatus, wherein the contacts between the gas and fragile members is reduced to a minimum, so as to preclude corrosions and objectionable leaks. A further object of the invention is to provide an apparatus of the aforesaid type enabling the amount of injected chlorine to be assessed with a greater accuracy than heretofore.

The apparatus according to the invention and satisfying the above requirements is characterised in that it comprises two enclosures communicating with each other through an orifice having an adjustable cross-sectional area, the first enclosure being supplied with the gas to be injected and forming an expansion chamber and the second being supplied with the liquid to be processed and forming an absorption chamber; a pump adapted to generate in the second enclosure a vacuum or negative pressure which is transmitted to the first enclosure through said orifice; a device adapted to hold at a constant value the pressure difference between said two enclosures, whereby the amount of gas injected per time unit is proportional only to the cross-sectional area of the communication orifice; and a device for estimating said cross-sectional area and thus the amount of injected gas.

Thus the apparatus provided by the invention is based on a new principle for measuring the amount of injected gas. It is known that the flow rate of a gas in a pipe is determined by the formula:

$$Q = S \cdot \alpha \cdot \beta \sqrt{\frac{2g \cdot P_1 - P_2}{d}} \qquad (I)$$

wherein:

S is the cross-sectional area of the pipe;
$\alpha$ and $\beta$ are readily determinable parameters;
$P_1$ and $P_2$ are gas pressures at the pipe inlet and outlet, respectively;
$d$ is the specific gravity of the gas; and
$g$ is the gravity acceleration.

Whereas in prior art devices, the cross-sectional area S was kept constant and the control was exerted on the difference $P_1-P_2$, which difference was measured, in the apparatus provided by the invention, this difference is kept at a constant value and the cross-section S is regulated, this cross-section being of course much easier to estimate with accuracy than the pressure difference. Moreover, the estimation of the cross-section S does not require either the passage of the corrosive gas through the measuring device, or the expansion thereof in membrane-type reducing valves.

Thus, it can be said that all the above-mentioned drawbacks have been successfully eliminated.

Further features and advantages of the invention will become apparent from the ensuing description, when read in connection with the accompanying drawings, given merely by way of example and in which:

FIGS. 3, 4 and 5 are sectional views on an enlarged scale of details of the apparatus shown in FIGS. 1 and 2.

Figure 1:
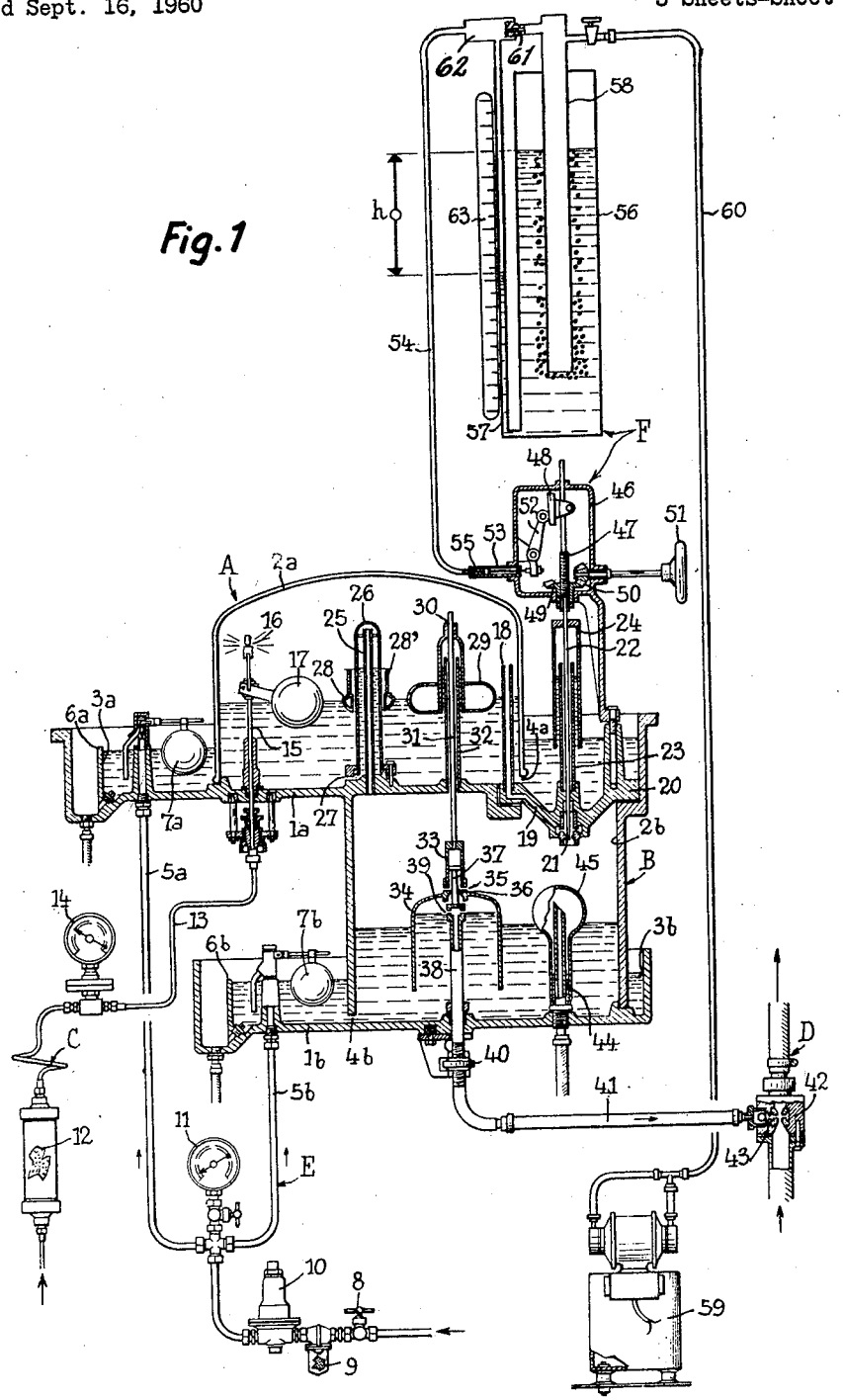
FIG. 1 is a diagrammatic illustration of one embodiment of the apparatus.

In accordance with the embodiment illustrated in FIG. 1 and adapted for the chlorination of water for purpose of sterilising the same, the apparatus generally comprises:

A chlorine expansion chamber A;
A chlorine absorption chamber B;
A device C adapted to supply the chamber A with chlorine;
A distributing circuit D for the motive water connected with chamber B;
An auxiliary water circuit E supplying the chambers A and B; and
A measuring device F of the amount of injected chlorine.

All these parts will be now examined in detail.

The chamber A is formed of a horizontal plate 1$^a$ having resting thereon a dome 2$^a$, which has an annular pan 3$^a$ formed thereabout, communicating with the interior of the dome 2$^a$ through a space 4$^a$.

The pan 3$^a$ has water fed thereinto from the circuit E through a line 5$^a$. The water level of this pan is held at a constant value by the provision of an overflow 6$^a$ and a float 7$^a$ which plugs the outlet nozzle of the line 5$^a$ when the water has reached the overflow level.

Thus, the pan 3$^a$ affords a hydraulic seal for the dome 2$^a$.

The chamber B includes similar or similarly-acting components as the above-enumerated components of the chamber A; accordingly, these will not be described and have been given the same references as in the chamber A, with the addition of the suffix "b." It has to be pointed out in this connection that, since chambers A and B are superposed, the dome 2$^b$ is comprised by a portion of plate 1$^a$ and has side-walls integrally formed with this plate.

After having mentioned that the circuit E is completed by a stop-valve 8, a filter 9, a reducing valve 10 and a manometer 11, the specific components of chambers A and B will now be described.

The chamber A has chlorine fed thereinto from the feeding device C which merely comprises, besides a liquefied gas source (not shown), a filter 12 and a tube 13 having a manometer 14 connected therewith. The tube 13 is coupled to an inlet tube 15 extending through the plate 1$^a$ and into the dome 2$^a$ by a distributor head 16. The cross-sectional area of the orifices in the distributor head 16 is controlled so as to be the larger when the float is at a higher level.

The atmosphere enclosed in the dome $2^a$ is connected with the atmosphere of the dome $2^b$ by means of a tube 18 which extends into a line 19 recessed in an inserted portion 20 of plate $1^a$. The line 19 extends by the other end thereof into the dome $2^b$ by way of a nozzle orifice 21, the cross-sectional area of the passage therethrough being adjustable by a needle valve 22; this needle valve 22 is slidably mounted in a sleeve member 23 around which a hydraulic seal is formed by a cap 34. The control of the needle valve 22 will be discussed in connection with the measuring device.

The chamber A is completed by a manometer adapted to measure the pressure differential in the chambers A and B and a device adapted to hold said differential at a constant value.

The manometer comprises a tube 25 communicating with the dome $2^b$ through the plate $1^a$ and a bell 26 surrounding this tube and seating on the plate $1^a$, a gap 27 being left between the two members. An annular float 28 surrounds the bell 26 and is provided with pointers 28' the length of which is corresponding to the water level representing the constant pressure differential which it is desired to maintain between chambers A and B. A simple comparison with the level in the bell 26 provides an indication showing whether the operation of the apparatus is normal.

The device adapted to hold at a constant value the pressure differential in chambers A and B comprises an annular float 29 extended by a bell 30 having a rod 31 secured therein. This rod 31 extends through the plate $1^a$ and is movable within a tube 32 fixed to the plate and surrounded by the bell 30, thus providing a hydraulic seal.

Thus, the rod 31 can be engaged into the dome $2^b$ in a leakproof way, where it is secured to a cylinder 33 integrally formed with a bell 34 (see FIG. 4).

The cylinder 33 has lateral apertures 35 formed therein and the interior volume thereof is connected with that of the bell 34 through a port 36. The passage through this port 36 is regulated by a needle valve 37, in accordance with the vertical position of the bell 34, the cross-section of the passage through the port 36 increasing as the bell 34 rises. The size of the apertures 35 is such as to cause no pressure drop even at a maximum chlorine gas flow.

The needle valve 37 is integrally formed with an outlet tube 38 for the chlorine solution escaping from B through the side orifices 39 in the tube 38; it will be understood that this solution consists of the chlorine gas which issues from the nozzle 21 and is absorbed by the liquid in the chamber B. The height of these orifices 39 above the plate $1^b$ is adjustable by a sliding motion of the tubular member 38 effected by means of a bolt and nut device 40. The tube 38 communicates through a line 41 to the distributing circuit D of the motive water. This latter circuit is formed by a simple duct having water under pressure fed thereinto, causing in the line 41 a suction owing to the provision of a Venturi 42. A ball 43 acts as a valve and seals off the line 41 from the circuit D when the latter is not supplied.

The chamber B is completed by a vacuum breaker formed by a simple tube 44 extending through the plate $1^b$ and connected to drain means, this tube being surrounded by a bulb 45 forming a hydraulic seal thereabout (see FIG. 5). The vacuum breaker is a safety device adapted to put the interior of the chamber B in communication with the atmosphere should the vacuum or negative pressure in this chamber reach as undesirably high value, which could occur if the supply of chlorine to the apparatus through the head 16 ceases.

The bulb 45 floats on the liquid in the chamber B and rises and descends with the level of this liquid in normal operation of the apparatus. As the bore of the tube 44 is in communication with atmospheric pressure, the level of the liquid within the skirt $45^a$ of the bulb is lower than that of the liquid outside the bulb. It will be understood that as the level of the liquid in the chamber B rises, the bottom end of the skirt $45^a$ will eventually reach the level of the liquid within this skirt, the hydraulic seal will be broken, air will be automatically admitted into the chamber B through the tube 44 and no further increase in the negative pressure, that is, no further rise of liquid, in the chamber B will be possible.

The measuring device F will now be discussed, this device being sensitive to the variation of the cross-sectional area of the nozzle 21 effected by the needle-valve 22. The stem of this valve extends into a control casing 46 secured to the member 20 by a threaded portion 47, having a cam 48 therebeyond formed by a substantially vertical wedge. The threaded portion 47 has cooperating therewith a nut 49 journalled in the bottom of the casing 46, and rotatable by means of a bevel gear 50, through a fly-wheel 51.

The cam 48 bears against one end of a lever 52 pivotally connected by the intermediate portion thereof to the casing 46 and the other end of which is integrally formed with a feeler 53 (see FIG. 3). In accordance with the actual position of the cam 48, this feeler member plugs to a greater or smaller extent the outlet opening of a line 54, in which it is slidably mounted against the action of a return spring 55. The arrangement is such that the cross section of this outlet opening is the greater when the cross section of the nozzle 21 is the smaller.

The line 54 is connected in the measuring circuit proper; the latter comprises a liquid manometer having two branches 56, 57. The branch 56 has extended thereinto a standpipe 58 fed with air or another compressed gas from a compressor 59 and a line 60. This standpipe 58 is also in communication through a calibrated orifice 61 provided at the upper portion thereof, with a chamber 62. This chamber 62 has connected at an intermediate portion thereof the aforesaid branch 57, whereas line 54 connects with the end of chamber 62 remote from the orifice 61. Thus, the branch 57 is subject to a pressure which is a function of the ratio of the cross sections of orifice 61 and orifice of line 54, respectively, the latter orifice being plugged to a variable extent by the feeler 53. It will be subsequently seen that this pressure is proportional to the amount of chlorine passing in the nozzle 21.

This pressure results in a level differential $h$ between the branches 56 and 57, which differential can be read on a scale 63.

This apparatus operates as follows:

The nozzle 21 being adjusted at a given opening and the auxiliary water circuit E and the water circuit D being assumed to be open, the following will be observed upon the apparatus being started.

The lower and the upper pans $1^b$ and $1^a$ are filled with water until the liquid reached the overflow level $6^a$, $6^b$, respectively.

The venturi 42 interposed in the circuit of motive water D creates a vacuum or negative pressure which is first felt under the bell 34, which is connected to the device 29, 30, 31. This causes the water level within the bell 34 to rise up to the vacuum-transmitting tube 39.

This vacuum thereafter builds up outside the bell 34 within the dome $2^b$ by way of the orifice 36 and the calibrated orifices 35. Thus the chamber B is evacuated, whereby the water level rises therein.

Finally, this vacuum is transmitted through nozzle 21, line 19 and tube 18, into the dome $2^a$, whereby the water level within the latter is also caused to rise.

Owing to this level elevation, the following occur:

(a) The opening by the float 17 of the chlorine-distribution orifices in the head 16, (b) The elevation of the annular float 29, which controls through the connection 31 the movement of the bell 34. Owing to the specific construction, the latter action regularises the vacuum in the absorption chamber B through the needle-valve 37 modifying the cross sectional area of the orifice 36.

As aforementioned, the nozzle 21 is open to any desired extent.

The arrangement is such that the nozzle 21 creates, irrespective of its opening rate, a constant pressure drop, e.g. 100 mm. water. This pressure drop can be calculated by the following expression:

$$\Delta h = K \frac{V^2 W}{2g} \quad (II)$$

wherein:

$\Delta h$: pressure drop across the nozzle 21 expressed in millimeters of water
$K$: a coefficient variable in accordance with the extent of opening of the nozzle
$V$: gas velocity in the free sectional area of the nozzle 21 in meters/second
$W$: specific weight of the chlorine gas
$g$: 9.81 meters per sec.

The maintenance of $\Delta h$ at the desired constant value is achieved by the combined variation of $K$ and $V^2$, the other factors remaining constant. For any given degree of opening, the vacuum passes through the nozzle 21 and thus, evacuates the interior of the dome $2^a$, causing the water level to rise therein and, accordingly, the float 17 of the chlorine inlet valve to rise correspondingly. The thus-freed chlorine in the expansion chamber A can only follow a one-way path leading to the nozzle 21.

Under the dome $2^a$, the water level rises until the necessary and sufficient amount of chlorine, freed by the rise of the float, generates in the tube 18, upstream of the nozzle 21, a velocity compatible with the extent of the opening thereof, so as to obtain $$\Delta h = 100 \text{ mm. water}$$

During the same time interval, the annular float 29 also rises, thus obliging the bell 34 to rise therewith. This upward movement reduces the pressure drop across the orifice 36, owing to the specific construction of the needle valve 37 which has a cross sectional area which decreases from its lower end towards its upper end. Thus, an upward or downward displacement of the float 29 causes respectively an increase or decrease in the pressure drop across the orifice or port 36. The exact shape of the needle valve 37 is of course so determined that the pressure differential between the chambers A and B remains constant irrespective of the size of the free passage through the nozzle 21 determined by the position of the needle valve 22. In other words, any downward or upward movement of the float 29 creates a variation in the pressure drop across the port 36, expressed in head of water, equal to the travel of this float.

It follows therefore that, in accordance with the opening extent of the nozzle 21, an equilibrium position will be established between the water level under the dome $2^a$, that is in chamber A, and that within the absorption chamber B, so that $$P_1 - P_2 = \Delta h = 100 \text{ mm. water}$$

where $P_1 - P_2$ represents the pressure differential between the chambers A and B.

The purpose of the apparatus is, as aforesaid, to inject a metered amount of chlorine as well as to provide a measure of the thus-metered gas.

This depends, of course, on the Formula I of the flow law of a gas in a pipe, which is, as previously stated:

$$Q = S \cdot \alpha \cdot \beta \sqrt{\frac{2g \cdot P_1 - P_2}{d}} \quad (I)$$

The radical $$\sqrt{\frac{2g(P_1 - P_2)}{d}}$$

is held at a constant value by virtue of the very design of the apparatus ($(P_1 - P_2)$ being the constant pressure differential between the chambers A and B). The coefficients $\alpha$ and $\beta$ are easily calculable and vary only within known limits, which are readily taken into account at the calibration stage.

The flow rate variation of the gas will thus be practically a function of the variation of S, i.e. of the free cross sectional area of the nozzle 21. It will be enough to measure this area with precision to obtain the flow rate of the distributed gas. Such is the part which the device F is due to play.

This device transforms indirectly the variations of the opening of the nozzle 21, in the first place, into variations of the vertical position of cam 48 and, in the second place, into variations of air flow escaping from line 54. The latter variations are known at once since they lead to pressure variations which can be readily seen on the manometer 56, 57.

The arrangement provides in fact two orifices (orifice 61 and the feeler-escapment orifice 53) connected in series and fed by a compressed air stream from line 60. If the pressure prevailing in the line 60 is constant, the pressure $h$ in the tube 57, i.e. between the two aforesaid orifices depends on the cross section ratio thereof.

Since the cross section of the orifice 61 is fixed (calibrated orifice), the manometer used to ascertain the values of $h$ truly records the variations of the cross section of the feeler-escapment orifice 53. If this latter cross section is increased, the pressure $h$ decreases, and viceversa.

But owing to the specific construction of the apparatus, the variations of this last cross section are directly related to the extent of the opening of nozzle 21. Thus it may be seen that the change of level $h$ in the branch 57 is proportional to the distributed chlorine flow rate and that the scale 63 can be readily graduated in terms of flow rates. It will be appreciated that by suitably proportionating the cross sections of the two orifices in series, it is quite possible to achieve large amplification coefficients, further improving the precision of the unit.

The foregoing indications are entirely confirmed by experience. However, in practice, certain "pumping phenomena" will be sometimes observed during the operation of the apparatus. This expression applies to level fluctuations between the chambers A and B, owing to a lack of stability of the control members, which is, in turn, due to unavoidable transmission delays between the control sensitive members and the control performing members actuated by the former.

According to an alternative embodiment of the invention, it has been found that these phenomena can be suppressed by means of an improved arrangement of the expansion chamber A.

Figure 2:
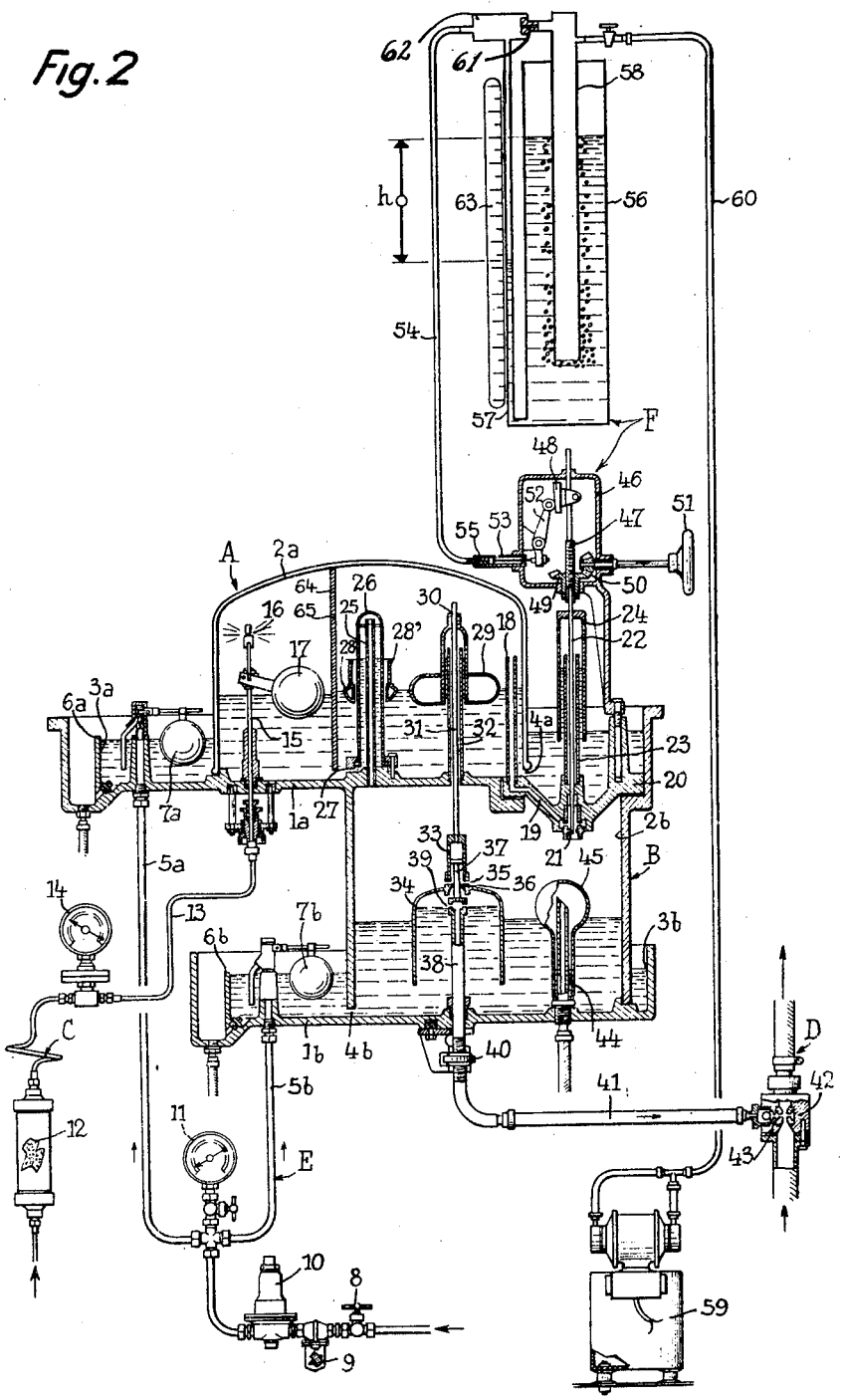
FIG. 2 shows an alternative embodiment thereof.

In this arrangement, which is illustrated in FIG. 2 of the drawing, which is similar to FIG. 1 and in which similar or identical members bear the same references as in the former, the expansion chamber is separated in two compartments, into which extend respectively, the gas supply tube and the communication orifice between the two chambers, these compartments communicating through a reduced-cross section orifice creating a pressure drop therebetween.

This separation is achieved in the most simple way, as shown, by means of a partition 64 extending from the dome $2^a$ up to a point close to the plate $1^a$. This partition has formed in the upper portion thereof a diaphragm-forming orifice 65, affording the required pressure drop between the two thus-formed compartments, when the venturi 42 generates a gas suction.

The time delay due to this partition 64 in the kinematic chain connecting the venturi 42 with the gas-distributing head 16, precludes the level fluctuations of the water in the chambers 2 and B, and the resultant perturbations in the operation of the device.

It will thus be seen that the disclosed apparatus enables the amount of injected chlorine to be accurately measured, and the flow rate thereof to be accurately controlled.

It is to be noted that this measuring is performed by means of a sturdy device which is not subjected to the corroding action of chlorine. The sturdiness is in any case a distinctive feature of the present apparatus, since it does not include any fragile members, such as membrane-expansion valves, and the majority of the seals are hydraulic seals.

Moreover, the operation of the apparatus is simply controlled by the initiation of the distributor circuit D, which provides at the same time the pumping means for the apparatus in order to obtain the desired vacuum. The apparatus can accordingly be very easily made an entirely automatic one.

It is to be understood that the invention is not restricted to the described and illustrated embodiments, which have been chosen merely as examples, but rather by the scope of the appended claims.

Having now described my invention what I claim as new and desire to secure by Letters Patent is:

1. Apparatus for metering the amount of gas sucked from the apparatus by suction means and injected into a liquid to be treated, said apparatus being useful in particular in a chlorination apparatus and comprising two enclosures, an orifice having an adjustable cross-sectional area and putting a first of said enclosures in communication with the second of said enclosures, a first inlet tube for connecting to the source of gas to be injected and opening into the first of said enclosures which forms an expansion chamber for said gas, a second inlet tube supplying liquid to the second of said enclosures which constitutes an absorption chamber, an outlet tube for the liquid in said second enclosure, said outlet tube communicating with said suction means, which latter creates in said second enclosure a depression which is transmitted to said first enclosure through said orifice, means combined with the outlet tube and including relatively movable valve elements defining a passageway the cross-sectional area of which is regulated by the relative movement between the valve elements, the outlet tube communicating with the inside of the second enclosure in the part of the latter above said liquid therein by way of said passageway, means responsive to the depression prevailing in the first enclosure and including a movable element which moves in opposite directions for opposite changes in the depression in the first enclosure, said movable element being operatively connected to one of said valve elements for effecting said relative movement between said valve elements, the shape of one of said valve elements being determined in such manner that said passageway increases in cross-sectional area when the depression decreases in said first enclosure and that the pressure difference between the two enclosures is held at a constant value whereby the amount of gas injected per time unit is proportional only to the cross-sectional area of said orifice, and means for measuring said cross-sectional area and thus the amount of injected gas.

2. Apparatus for metering the amount of gas sucked from the apparatus by suction means and injected into a liquid to be treated, said apparatus being useful in particular in a chlorination apparatus and comprising two enclosures, an orifice having an adjustable cross-sectional area and putting a first of said enclosures in communication with the second of said enclosures, a first inlet tube adapted to be connected to the source of gas to be injected and opening into the first of said enclosures which forms an expansion chamber for said gas, a second inlet tube supplying liquid to the second of said enclosures which constitutes an absorption chamber, an outlet tube for the liquid in said second enclosure, said outlet tube communicating with said suction means, which latter creates in said second enclosure a depression which is transmitted to said first enclosure through said orifice, a bell in said second enclosure surrounding said outlet tube, the base of said bell extending into the liquid contained in said second enclosure, means responsive to changes in the depression in said first enclousre and including an element which moves in one direction when the depression in said first enclosure increases and in the opposite direction when the depression in the first enclosure decreases, said element being connected with said bell, a port provided in the bell so that the interior of the bell communicates with said second enclosure through the port, an upwardly convergent valve member fixed to the second enclosure and extending through the ports, the cross-sectional area of the passage between the port and the valve member being therefore variable as a function of the position of said element, whereby said passage diminishes when the depression decreases in said first enclosure and increases when said depression increases, the shape of said valve member being determined experimentally in such manner that the pressure difference between the two enclosures is held at a constant value, the amount of gas injected per time unit being thus proportional only to the cross-sectional area of said orifice, and means for measuring said cross-sectional area and thus the amount of injected gas.

3. Apparatus as claimed in claim 2, wherein each of said enclosures includes a dome seated on a plate, fluid tightness between each dome and each plate being provided by a hydraulic seal supplied with liquid from an auxiliary circuit, said movable member and said bell being housed within the dome of the respective enclosure and said movable member comprising a float connected to said bell by a linkage.

4. Apparatus as claimed in claim 2, wherein said outlet tube is extended by said valve member inserted into said port.

5. Apparatus for metering the amount of gas sucked from the apparatus by suction means and injected into a liquid to be treated, said apparatus being useful in particular in a chlorination apparatus and comprising two enclosures, an orifice having an adjustable cross-sectional area and putting a first of said enclusres in communication with the second of said enclosures, each of said enclosures comprising a plate and a dome resting on said plate, the latter forming a pan around said dome and the interior of the dome communicating with said pan at the bottom of the dome, a liquid inlet tube opening into each of said pans, the liquid from the liquid inlet tube forming a hydraulic seal between the dome and pan of the corresponding enclosure, an inlet tube for the gas to be injected opening into the dome of the first of said enclosures forming an expansion chamber for said gas, an overflow outlet tube for the liquid in the second of said enclosures and communicating with said suction means so that said suction means creates in said second enclosure a depression which is transmitted to said first enclosure through said orifice, a valve device controlling the flow of said gas through said gas inlet tube, said valve device being responsive to the depression prevailing in said first enclosure and increasing the flow of said gas as the depression in said first enclosure increases, a bell in said second enclosure surrounding said outlet tube, the base of said bell extending into the liquid contained in said second enclosure, a member movable in said first enclosure as a function of the depression prevailing therein and connected with said bell, a port provided in the bell so that the interior of the bell communicates with the interior of said second enclosure through the port, an upwardly convergent valve member fixed to the second enclosure and extending through the port, the cross-section area of the passage between the port and the valve member being therefore variable as a function of the vertical position of said movable member, whereby said passage diminishes when the depression decreases in said first enclosure and increases when said depression increases, the shape of said valve member being determined experimentally in such manner that the pressure difference between the two enclosures is held at a constant value, the amount of gas injected per time unit being thus proportional only to the cross-sectional area of said orifice, and means for measuring said cross-sectional area and thus the amount of injected gas.

6. Apparatus as claimed in claim 5, wherein said first enclosure is divided into two compartments, into which respectively open the gas inlet tube and the orifice through which said two enclosures comunicate, said two compartments communicating through an orifice having a reduced cross-section and creating therebetween a pressure drop.

7. Apparatus as claimed in claim 5, wherein a partition extending from the dome of said first enclosure down to a short distance above the plate thereof, divides said enclosure into two compartments, the gas inlet tube opening into a first of said compartments and the orifice through which said two enclosures communicate being located in the second of said compartments, said partition being provided in its portion remote from said plate with a hole forming a diaphragm.

8. Apparatus as claimed in claim 5, comprising a float and valve means controlling the liquid passageway of the liquid inlet tube and an overflow in the pan of each enclosure so as to maintain the level of the liquid in each pan at a constant value.

9. Apparatus for metering the amount of gas sucked from the apparatus by suction means and injected into a liquid to be treated, said apparatus being useful in particular in a chlorination apparatus and comprising two enclosures, an orifice having an adjustable cross-sectional area and putting a first of said enclosures in communication with the second of said enclosures, each of said enclosures comprising a plate and a dome resting on said plate, the latter forming a pan around said dome and the interior of the dome communicating with said pan at the bottom of the dome, a liquid inlet tube opening into each of said pans, the liquid from the liquid inlet tube forming a hydraulic seal between the dome and pan of the corresponding enclosure, an inlet tube for the gas to be injected opening into the dome of the first of said enclosures forming an expansion chamber for said gas, an overflow outlet tube for the liquid in the second of said enclosures and communicating with said suction means so that said suction means creates in said second enclosure a depression which is transmitted to said first enclosure through said orifice, a bell in said second enclosure surrounding said outlet tube, the base of said bell extending into the liquid contained in said second enclosure, a member movable in said first enclosure as a function of the depression prevailing therein and connected with said bell, a port provided in the bell so that the interior of the bell communicates with the interior of said second enclosure through the port, an upwardly convergent valve member fixed to the second enclosure and extending through the port, the cross-section area of the passage between the port and the valve member being therefore variable as a function of the vertical position of said movable member, whereby said passage diminishes when the depression decreases in said first enclosure and increases when said depression increases, the shape of said valve member being determined experimentally in such manner that the pressure difference between the two enclosures is held at a constant value, the amount of gas injected per time unit being thus proportional only to the cross-sectional area of said orifice, and means for measuring said cross-sectional area and thus the amount of injected gas, the outlet of the gas inlet tube having its cross-section controlled by a float floating on the liquid in the first enclosure so as to be the larger as the depression in said first enclosure is itself larger.

10. Apparatus as claimed in claim 5, wherein vacuum breaking means are provided in said second enclosure, said vacuum breaking means comprising a bell resting on the plate of said enclosure with which it communicates at its bottom and a tube housed within said bell and extending through said plate so as to communicate with the atmosphere outside the apparatus.

11. Apparatus as claimed in claim 5, wherein a manometer is provided in said first enclosure to measure the pressure difference between said two enclosures, said manometer comprising a bell resting on the plate of said first enclosure with which it communicates at its bottom and a tube housed within said bell and extending through said plate into the dome of said second enclosure so as to communicate with the atmosphere thereof.

12. Apparatus as claimed in claim 11, wherein said manometer bell is surrounded by a float, said float bearing an index, the height of which is equal to a liquid column corresponding to the constant pressure difference which it is desired to maintain between the two enclosures, whereby a simple comparison between the liquid level in said bell and said index enables the correct operation of the apparatus to be checked.

13. Apparatus for metering the amount of a gas sucked by suction means and injected into a liquid to be treated, useful in particular in a chlorination apparatus, said metering apparatus comprising two superimposed enclosures, each comprising a plate and a dome resting on said plate, the latter forming a pan around said dome and the interior of the dome communicating with said pan at the bottom of the dome, inlet tubes for liquid, each opening into the pan of said two enclosures so that the liquid in the pan forms a hydraulic seal for the corresponding enclosure, a gas inlet tube for connecting to the source of gas to be injected, the gas inlet tube opening into the dome of the first and uppermost of said enclosures which forms an expansion chamber for said gas, a communication tube opening at one end into the dome of said first enclosure and extending through the plate thereof into the dome of the second of said enclosures with which it communicates through an orifice, a valve member extending into said orifice for varying the cross-sectional area thereof and means for measuring said cross-sectional area, an outlet tube for the liquid of said second enclosure and communicating with said suction means, a bell in said second enclosure surrounding said outlet tube, the base of said bell extending into the liquid contained in said second enclosure, a float floating on the liquid in the first enclosure so as to move as a function of the depression prevailing in the first enclosure, a stem extending through the plate of said first enclosure by means of a hydraulic seal and connected at one end to said float and at the other end to said bell, a valve casing formed in said bell and comprising a port ensuring communication between said bell and said second enclosure, a second upwardly convergent valve member disposed in said port and unitary with said outlet tube, whereby the passage between the second valve member and said port decreases when the depression decreases in said first enclosure and increases when said depression increases, the shape of the second valve member being such that the pressure difference between the two enclosures is maintained at a constant value, the amount of gas injected per time unit being thus proportional only to the cross-sectional area of said orifice and being measured by said measuring means.

14. Apparatus as claimed in claim 13, wherein the outlet in the dome of said first enclosure of the gas inlet tube has its cross-section controlled by a float so as to be the larger as the depression in said first enclosure is itself larger.

15. Apparatus as claimed in claim 13, wherein said measuring means comprises a liquid manometer having two branches, a source of compressed gas connected to the first of said branches by a plunger tube and to the second of said branches through a calibrated second orifice provided at the top thereof, said second branch also comprising a gas escape third orifice connected in series with said calibrated second orifice, the cross-sectional area of the gas escape third orifice being controlled by said first valve member so as to vary inversely as a function of the cross-sectional area of said orifice through which the enclosures intercommunicate.

16. Apparatus as claimed in claim 15, wherein said valve member is slidably mounted within said orifice through which the enclosures intercommunicate and comprises a stem, a wedge-like cam being unitary with said stem and acting on a feeler which controls the cross-sectional area of said gas escape third orifice.

17. Apparatus as claimed in claim 15, wherein said stem comprises a threaded portion cooperating with a nut through the medium of which said valve member is slidably moved within said orifice through which the enclosures intercommunicate.

References Cited in the file of this patent

UNITED STATES PATENTS

| | | |
|---|---|---|
| 1,514,939 | Wallace | Nov. 11, 1924 |
| 1,715,801 | Turner | June 4, 1929 |
| 2,619,114 | Conkling | Nov. 25, 1952 |
| 2,929,393 | Wallace et al. | Mar. 22, 1960 |
| 3,074,422 | Leviel | Jan. 22, 1963 |

FOREIGN PATENTS

| | | |
|---|---|---|
| 708,044 | Great Britain | Apr. 28, 1954 |